Figures 1, 2:
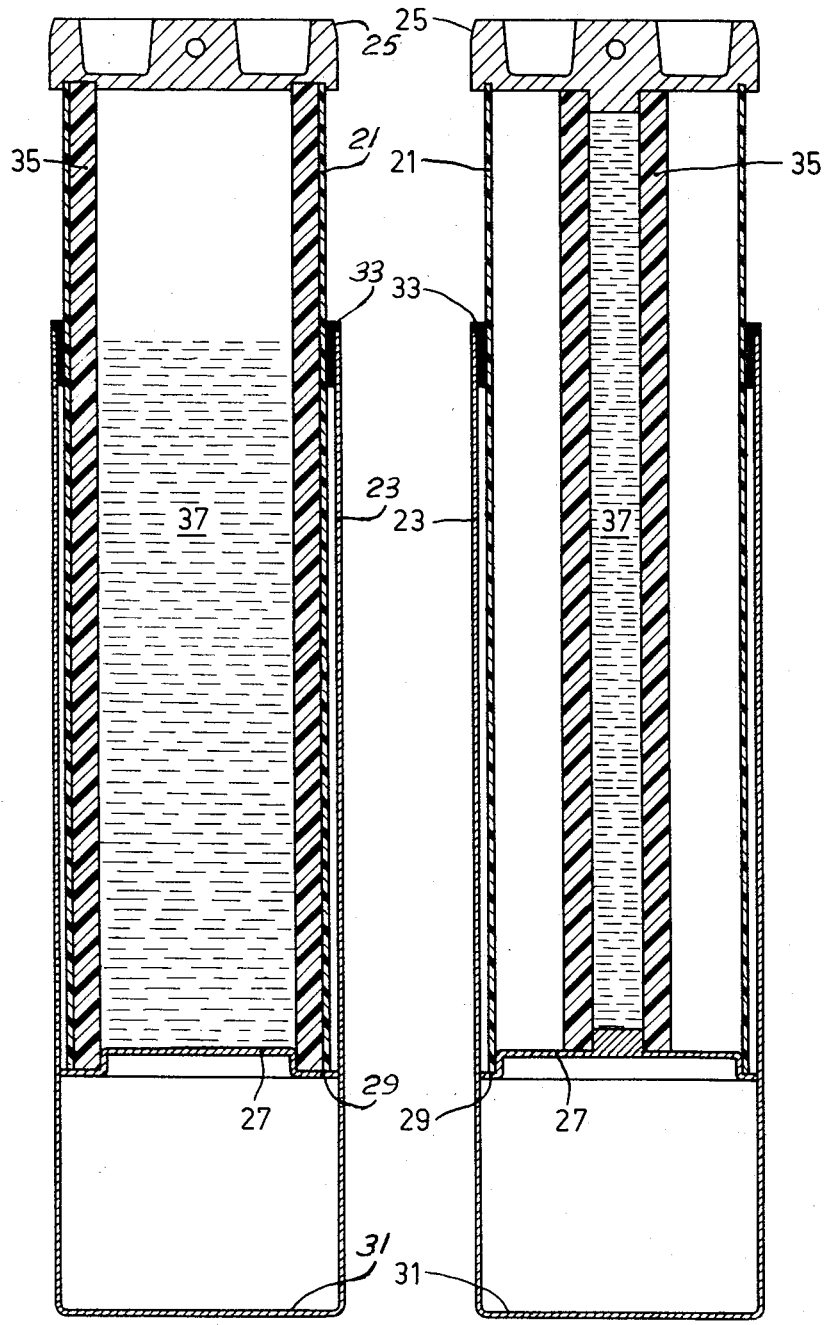

United States Patent [19]

Hoek et al.

[11] 3,770,199

[45] Nov. 6, 1973

[54] DEVICE FOR THE CONTROLLED EMISSION OF VAPOURS

[75] Inventors: Serge Hoek; Wilhelm Buhren, both of Amsterdam, Netherlands

[73] Assignee: U.S. Philips Corporation, New York, N.Y.

[22] Filed: Sept. 13, 1971

[21] Appl. No.: 180,028

[30] Foreign Application Priority Data

Sept. 30, 1970 Netherlands......................7014338

[52] U.S. Cl..................................... 239/54, 239/55
[51] Int. Cl................................................ A61l 9/04
[58] Field of Search ............... 239/44, 53, 54, 55, 239/57, 58, 59, 60

[56] References Cited
UNITED STATES PATENTS

| 984,352 | 2/1911 | Costello................................. 239/57 |
| 3,204,871 | 9/1965 | Callander............................... 239/55 |
| 3,567,118 | 3/1971 | Shepherd et al.................. 239/44 X |
| 2,766,067 | 10/1956 | Shinberg............................... 239/54 |

FOREIGN PATENTS OR APPLICATIONS

| 309,854 | 3/1918 | Germany............................ 239/563 |
| 204,836 | 8/1959 | Austria................................ 239/563 |

Primary Examiner—Richard A. Schacher
Assistant Examiner—Andres Kashnikow
Attorney—Frank R. Trifari

[57] ABSTRACT

A device for the controlled emission of vapors comprising an inner tubular or box-shaped member which contains a volatile active substance and is permeable to vapor. The inner member is telescopingly arranged in a second tubular or box-shaped outer member so that the inner member may be entirely or partially sealed by the outer member. The inner member contains a porous container which may be filled with the active substance and the maximum pore width of which is 30 microns. The container is preferably made of polyethylene. The inner member may either be apertured or be made of a porous material.

2 Claims, 2 Drawing Figures

PATENTED NOV 6 1973  3,770,199

INVENTORS
SERGE HOEK
WILHELM BUHREN
BY
Frank R. Trifari
Agent

DEVICE FOR THE CONTROLLED EMISSION OF VAPOURS

The invention relates to a device for the controlled emission of vapours which comprises telescoping inner and outer box-shaped or tubular members, the inner member being permeable to vapour, forming a container for a carrier comprising a volatile active substance, and being closed at both ends, whilst the outer member is closed at one end and is provided with guiding means for the inner member which may at least partly be covered by the outer member.

In a known device of the said type, the inner member may be filled with an active substance in the form of a powder or a tablet. When an active substance in the liquid state is used a cartridge impregnated with the liquid is arranged in the inner member. In the latter embodiment the capacity of the device is restricted to the amount of liquid which the cartridge is capable of taking up. Manufacturing and impregnating the cartridge provides difficulty when the device is manufactured by mass-production methods.

It is an object of the invention to provide a device for the controlled emission of vapours which is particularly suited for volatile active substances in the liquid or viscous state, has a comparatively large capacity and the useful life of which may be determined by the amount of liquid with which it is filled.

According to the invention, this object is mainly achieved in that the carrier is a porous container which may be filled with a liquid active substance and the maximum pore width of which is 30 microns.

By using a porous container as a carrier for an active substance in the liquid or viscous state, the filling up may take place directly and simply; this enables the filling process to be automatized. In addition, the container may be filled with an active substance which is liquid at an elevated temperature and solidifies at a lower temperature. In order to prevent leakage of the container the maximum pore width should in general not exceed in 30 microns. The ultimate choice of the pore width is related to the viscosity of the active substance. The useful life of the device may be influenced by the dimensions of the container and/or by the extent to which it is filled.

The container may be made from any suitable porous material, for example a porous glass or a porous ceramic or synthetic material. However, in a preferred embodiment of the device according to the invention the container is made of polyethylene. This material may be simply worked to form a container, especially a tubular or box-shaped container, and moreover has a high chemical resistance, so that it is suitable for most volatile chemical substances.

The vapour-permeable inner member which encloses the container may be made from a compact gas-tight material, for example a metal, a synthetic material or paper board, and may be apertured in known manner. In a further preferred embodiment of the device according to the invention, the inner member is porous and made of a low-pressure polyethylene having a high specific weight. Owing to the high mechanical resistance of the polyethylene, wear of the inner member due to the relative displacement of the inner and outer members is very slight.

The porous inner member may enclose the container with a certain amount of clearance, in which case the maximum pore width of the inner member is not critical and need only be sufficient to enable the vapours to pass. In order to obtain a maximum volume of the container with given dimensions of the inner member, in another preferred embodiment of the device according to the invention the outer surface of the container engages the inner surface of the inner member, the pore width of the inner member exceeding the maximum pore width of the container. Owing to the greater pore width of the inner member diffusion of the active substance into the wall of the inner member is prevented.

Embodiments of the invention will now be described, by way of example, with reference to the accompanying diagrammatic drawings, in which:

FIG. 1 is a longitudinal sectional view of an embodiment of a device according to the invention, and FIG. 2 is a longitudinal sectional view of another embodiment of such a device.

Referring now to FIG. 1, the device shown comprises telescoping inner and outer tubular or box-shaped members 21 and 23 respectively. The inner member 21 is hermetically sealed at both ends by a hood 25 and by a bottom 27 having a rim 29 respectively. The outer member 23 is at one end provided with a closing wall 31, and at the opposite, open end with a ring 33 which preferably is made of a synthetic material and fittingly encloses the inner member 21.

In the inner member 21 there is placed a porous container 35, which in the embodiment shown in tubular and is sealed at both ends by the hood 25 and the bottom 27. The container 35, which has a maximum pore width of 30 microns, may be filled entirely or partially with a liquid or viscous active substance 37 to be vaporized. The porous material may be a porous glass or a porous ceramic or synthetic material. However, the container 35 is preferably made of polyethylene, which has a high chemical resistance.

The inner member 21 is permeable to vapour and may be entirely or partially covered by the gas-tight outer member 23. The inner member 21 may be made of any suitable material, for example paper board, a metal or a synthetic material, and may be apertured in known manner. Preferably, however, the inner member 21 is porous and made of low-pressure polyethylene having a high specific weight, which material has a high resistance to wear.

In the embodiment shown in FIG. 1, the outer surface of the container 35 contacts the inner surface of the inner member 21, so that for any inner member the volume of the container is a maximum. If in this embodiment a porous inner member is used, the pore width of the inner member must be greater than the maximum pore width of the container; this prevents the diffusion of the active substance into the wall of the porous inner member.

In the embodiment shown in FIG. 2, there is a clearance between the container 35 and the inner member 21; when a porous inner member is used, its maximum pore width is not critical and need only be chosen so as to permit the emission of vapours.

The outer member 23 may be made of any suitable vapour-impermeable material.

During the relative displacements of the inner and outer members, the ring 33 forms a guiding means for the inner member 21 and, in conjunction with the rim 29 of the bottom 27, a stop preventing an undesirable complete separation of the two members. In the fully closed position of the device, the ring 33 in conjunction with the hood 25 prevents vapours from escaping. Since the ring 33 fittingly encloses the inner member 21, the two members are held in any relative intermediate position by frictional forces alone, the part of the inner member 21 not exposed to the ambient atmosphere being sealed by the ring 33.

In the embodiments described, the inner and outer members are telescoping. As an alternative, the members may be relatively rotatable. However, telescoping members provide a greater control range and better sealing.

What is claimed is:

1. A device for the controlled emission of vapors comprising an outer tubular member impermeable to vapor and closed at one end thereof and opened at its other end, a hermetically sealed inner tubular member telescopingly carried within said outer member, said inner member being permeable to vapor, a closed porous container carried within said inner member for carrying a liquid active substance, the maximum pore diameter of any of the pores of said closed container being 30 microns and quide means carried by said outer member for guiding said inner member therein, said inner member being porous and made of low-pressure polyethylene having a high specific weight, the outer surface of said container engaging the inner surface of the inner member, the pore width of the inner member being greater than the maximum pore width of the container.

2. The device as claimed in claim 1, wherein said inner and outer members are made of polyethylene.

* * * * *